(No Model.)
A. B. ANDREWS.
AUTOMATIC VEHICLE AND MOTOR POWER.
No. 559,561. Patented May 5, 1896.
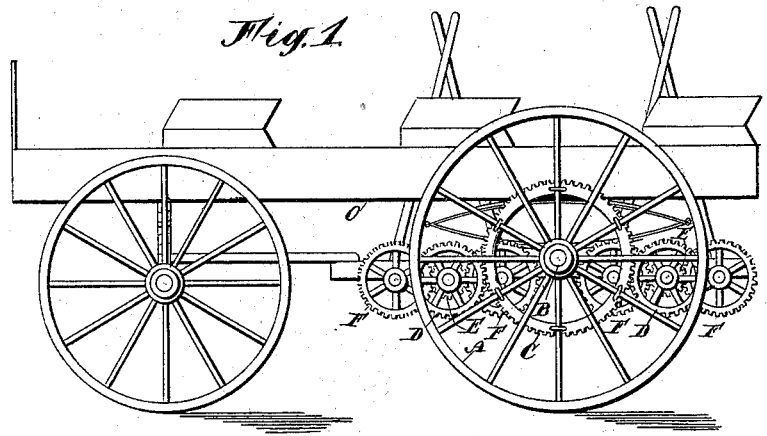
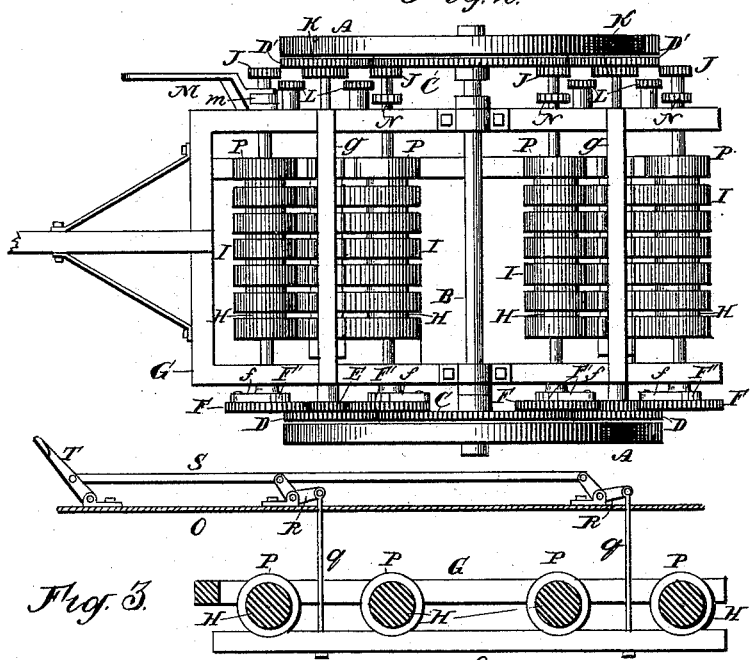
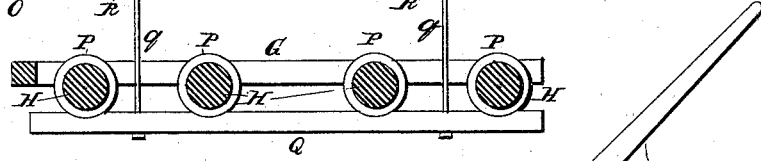
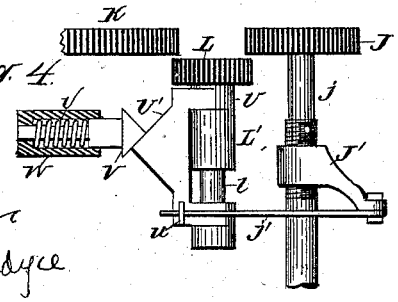
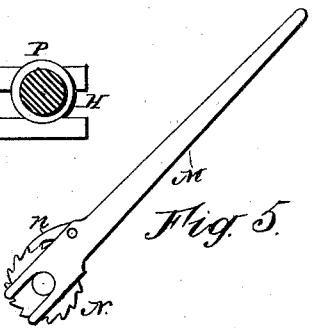
Attest
J. H. Helm
Wm. J. Fordyce
Inventor
Aretas B. Andrews
By J. M. St. John
Atty.

UNITED STATES PATENT OFFICE.

ARETAS B. ANDREWS, OF CENTRE POINT, IOWA.

AUTOMATIC VEHICLE AND MOTOR POWER.

SPECIFICATION forming part of Letters Patent No. 559,561, dated May 5, 1896.

Application filed August 31, 1895. Serial No. 561,161. (No model.)

*To all whom it may concern:*

Be it known that I, ARETAS B. ANDREWS, a citizen of the United States, residing at Centre Point, in the county of Linn and State of Iowa, have invented certain new and useful Improvements in Automatic Vehicles and Motor Powers; and I do hereby declare the following to be a full, clear, and exact description of the invention, such as will enable others skilled in the art to which it appertains to make and use the same.

The object of this invention is to provide for the running of vehicles and the like automatically or by motor power through spring-actuated mechanism; and the invention consists in the construction, combination, and arrangement of parts, as hereinafter fully set forth and claimed.

In the accompanying drawings, forming a part of this specification, Figure 1 is a side elevation of a spring-wagon with my improved actuating mechanism and motor power attached thereto. Fig. 2 is a plan view of the said mechanism and the rear wheels of the wagon, to which they are connected. Fig. 3 is an ideal longitudinal section showing the brake apparatus. Fig. 4 is a plan view, partly in section, illustrating a device for throwing one of the winding mechanisms into gear, so as to be wound up by others. Fig. 5 is a side elevation of a hand-lever for winding.

Similar letters of reference indicate corresponding parts.

Referring to the drawings, A A are the driving-wheels, preferably the rear ones, of a vehicle, suitably attached to an axle B, adapted to turn in bearings on the frame G. To these wheels are secured spur-gears C C. These gears mesh with gears D D D D at opposite ends of two shafts extending across the frame and mounted in suitable bearings. Adjacent to each gear D is a pinion E on the driving side of the machine (the lower side in Fig. 2) and a pinion K on the opposite winding side. The pinions E E mesh directly with the driving-gears F F F F at one end of the shafts, on which are mounted the driving-cylinders H H H H. The gears F are mounted to turn on their shafts, but are caused to revolve with the shaft in one direction by means of a ratchet and pawl F' f of the usual construction. To each cylinder is connected a series of flat helical springs I I, the outer ends of which are suitably connected to cross-bars g g of the frame.

Near the opposite end of each cylinder-shaft is a ratchet N, adapted to engage with the pawl n of the winding-lever M. This lever is doubly forked at the lower end, so as to straddle both the ratchet and the shaft. When not in use, it may be lifted out of position and laid in the body of the vehicle.

Adjacent to the springs I I is a friction-wheel P on each cylinder-shaft, and below them is suspended a brake-bar Q. This connects by rods q q with a pair of bell-crank levers R R, which in turn connect by a rod or bar S with a foot-lever T, hinged to the floor of the wagon-body O. A downward pressure on this foot-lever brings the brake-bar into contact with all the friction-wheels, and thus serves to regulate the speed of the vehicle.

The operation of the device will be readily understood. The operator or operators, seated in the vehicle, wind up the actuating mechanism by means of the hand-levers within easy reach. In the position in which they are represented in Fig. 1 the operator may grasp two levers with one hand, and thus wind two of the cylinders at once. The winding may be done while the vehicle is at rest or in motion. When at rest, the brake should of course be applied. When wound up and the brake liberated, the vehicle moves over the road at such a rate of speed as may be determined by the pressure of the brake, &c. Provision is made for shifting one of the cylinders into gear at a time, so as to be automatically wound up by the other mechanism. Pinions or gears J J J J are attached to the cylinder-shafts at the winding ends, and between them and the pinions K K are placed shifting idlers L L L L, meshing with each when in winding position, but slipping entirely out of gear therewith at other times. The shaft $l$, to which the pinion L is secured, slips a limited distance in its bearing L', which, it will be understood, is secured to some suitable part of the frame G. Between the pinion and a collar at the other end of its shaft is mounted a stirrup U, having an angled lateral extension U', making contact with a similarly-shaped plunger-head V. The stem of this plunger extends into a suitable bearing W, and is provided with a spring *v* to force the plunger outwardly. As soon as the stirrup passes the center of motion in either direction the plunger forces it over the rest of the distance, as will be readily understood.

Automatic motion is imparted to the shifting stirrup by means of a feed-nut J', mounted on a screw-threaded portion of the shaft *j*. A yielding connection is made between the feed-nut and the stirrup by a spring *j'*, the tension of which is such as to force the shifter past the center when near the end of the screw, when the gears are forcibly and quickly thrown into mesh. As soon as thrown into mesh the winding of this particular cylinder begins, the motion thereof being reversed. When fully wound up, the action of the shifter reverses, and the pinion L is again thrown out of mesh. It is to be understood that a greater or fewer number of driving-cylinders may be used than the number shown. In practice I prefer a larger number, six or eight, thereby affording a larger proportion of power for the running of the apparatus and winding of the extra cylinder.

The operation of the device will be readily understood. Supposing that six cylinders are used, one of these is first thrown into gear to be wound up by the other five. When so wound up, the second cylinder is put in gear for winding, and so on through the whole series. It is my intention to have the winding apparatus geared higher than the driving apparatus, so that the effect will be to wind up each cylinder in one-sixth of the time consumed in running it down. Five of the cylinders are thus always in use for driving and winding, one cylinder being wound up in one-sixth of the time, another in two-sixths, a third in three-sixths, and so on through the whole series.

Although the mechanism is shown applied to a vehicle, it will be understood that it is applicable to many other uses, and I desire to claim it for any purpose where power of this kind may be desired.

Having thus described my invention, I claim—

In an automatic vehicle and motor power, the combination with geared carrying-wheels attached to a revolving shaft or axle a plurality of spring-actuated cylinders and a double train of gearing connecting them with the carrying-wheels, one train to give positive and uninterrupted forward motion, and the other to give intermittent backward motion to the cylinders, one or more pinions adapted to slide in and out of mesh with the intermittently-moving, winding-gears, and an automatic shifter therefor consisting essentially of a screw-threaded shaft *j*, a nut J' mounted thereon, a spring *j'* connecting it with a stirrup U, and angled stirrup U U' to shift the said pinion in and out of mesh, and a spring-actuated plunger V with an angled head engaging the angled portion of said stirrup, substantially as described.

In testimony whereof I affix my signature in presence of two witnesses.

ARETAS B. ANDREWS.

Witnesses:
J. M. ST. JOHN,
J. F. GROAT.